US011876358B2

(12) United States Patent
Nielsen et al.

(10) Patent No.: US 11,876,358 B2
(45) Date of Patent: Jan. 16, 2024

(54) METHOD OF MANUFACTURING HVDC MASS IMPREGNATED CABLE TRANSITION JOINT

(71) Applicant: NEXANS, Courbevoie (FR)

(72) Inventors: Gard Nielsen, Sarpsborg (NO); Ben Kristian Johansen, Halden (NO)

(73) Assignee: NEXANS, Courbevoie (FR)

( * ) Notice: Subject to any disclaimer, the term of this patent is extended or adjusted under 35 U.S.C. 154(b) by 287 days.

(21) Appl. No.: 16/005,068

(22) Filed: Jun. 11, 2018

(65) Prior Publication Data

US 2018/0375223 A1 Dec. 27, 2018

(30) Foreign Application Priority Data

Jun. 14, 2017 (EP) .................................... 17305726

(51) Int. Cl.
*H02G 1/14* (2006.01)
*H01B 13/22* (2006.01)
*H01R 4/02* (2006.01)
*C21D 9/50* (2006.01)
*H01B 3/52* (2006.01)
(Continued)

(52) U.S. Cl.
CPC .................. *H02G 1/14* (2013.01); *C21D 9/50* (2013.01); *H01B 3/52* (2013.01); *H01B 3/54* (2013.01); *H01B 13/22* (2013.01); *H01R 4/029* (2013.01); *H01R 4/021* (2013.01); *H01R 4/70* (2013.01);
(Continued)

(58) Field of Classification Search
CPC ........ H02G 1/14; H02G 15/18; H02G 15/184; H02G 15/192; H02G 15/196; H02G 15/24; H02G 15/02; H01R 9/0503; H01R 4/021; H01R 4/029; H01R 4/70; H01B 3/52; H01B 3/54; H01B 13/22; C21D 9/50

See application file for complete search history.

(56) References Cited

U.S. PATENT DOCUMENTS 3,707,865 A    1/1973  Oriani
3,777,048 A *  12/1973 Traut ................... H02G 15/184
                                                        174/73.1
(Continued)

FOREIGN PATENT DOCUMENTS

EP    2026439    2/2009
EP    3139443    3/2017
(Continued)

OTHER PUBLICATIONS

Machine Translation of Japanese Patent Publication, JP 2012-22820, Feb. 2012. (Year: 2021).*
(Continued)

*Primary Examiner* — A. Dexter Tugbang
(74) *Attorney, Agent, or Firm* — IPSILON USA, LLP

(57) ABSTRACT

A method for creating a flexible transition joint between HVDC-MI cables having different diameters. The central wires of the conductors are thermally joined by a conical connection piece. The strands of the layers of stranded wires surrounding the central wires are rewound, cut and thermally joined along their respective lay lengths. The stranded are sanded/ground along the lay length of the strands to form a smooth uniform transition having the same slope as the conical connection piece. A paper lapping machine is used to form an insulation patch over the transition joint.

7 Claims, 13 Drawing Sheets

(51) Int. Cl.
*H01B 3/54* (2006.01)
*H02G 15/196* (2006.01)
*H02G 15/24* (2006.01)
*H02G 15/02* (2006.01)
*H01R 4/70* (2006.01)

(52) U.S. Cl.
CPC .......... *H02G 15/02* (2013.01); *H02G 15/196* (2013.01); *H02G 15/24* (2013.01)

(56) References Cited

U.S. PATENT DOCUMENTS

| | | | | |
|---|---|---|---|---|
| 3,874,960 | A * | 4/1975 | Matsuzaki | H01R 9/0503 156/49 |
| 4,233,096 | A * | 11/1980 | Wiberg | H02G 1/14 156/304.3 |
| 4,881,995 | A * | 11/1989 | Arenz | H02G 15/18 156/52 |
| 2010/0276196 | A1* | 11/2010 | Seraj | H01R 9/0503 174/84 R |
| 2012/0285725 | A1 | 11/2012 | Maritano et al. | |
| 2014/0251654 | A1 | 9/2014 | Liu | |
| 2015/0075864 | A1* | 3/2015 | Boedec | H02G 1/14 174/75 D |
| 2017/0330648 | A1 | 11/2017 | Krogh et al. | |

FOREIGN PATENT DOCUMENTS

| | | |
|---|---|---|
| GB | 783357 | 9/1957 |
| JP | 2001112139 A * | 4/2001 |
| JP | 2012 022820 | 2/2012 |

OTHER PUBLICATIONS

Vysotsky et al., "On stability of multistrand cables with insulated or highly resistive matrix strands," in IEEE Transactions on Applied Superconductivity, vol. 5, No. 2, pp. 572-575, Jun. 1995. (Year: 1995).*
European Search Report dated Dec. 13, 2017.
European Search Report dated Aug. 28, 2020.

* cited by examiner

METHOD OF MANUFACTURING HVDC MASS IMPREGNATED CABLE TRANSITION JOINT

This application claims the benefit of priority from

FIELD OF THE INVENTION

The present invention relates to high voltage cables, in particular high voltage DC Mass Impregnated submarine cables, and more particularly to transition joints between cables of different diameters.

BACKGROUND

For decades, high-voltage, direct current, mass impregnated cables (hereafter referred to as HVDC-MI cables) have been the preferred solution for long-distance submarine electrical transmission.

The conductor in a HVDC-MI cable is typically made from copper or aluminum and consists of a circular center wire surrounded by concentric layers of stranded, keystone-shaped wires, resulting in a very compact conductor with a smooth surface. The strands are wound in a spiral, with the layers being wound in alternating directions, e.g. the first layer is wound in a clockwise spiral, the next layer wound in a counter clockwise spiral and so on. The configuration of central wire/stranded wires provides the cable with improved flexibility.

The conductor is surrounded by a plurality of insulating/protective layers. The insulation system usually consists of lapped paper tapes impregnated with a high viscosity compound (hence the term "mass impregnated"). A moisture-proof barrier—a lead alloy sheath—is usually applied above the insulation system, and for mechanical and corrosion protection, a polyethylene sheath may be applied. For mechanical strength, transversal reinforcement and steel wire armoring may be applied. To achieve a torsion-balanced design, two layers of armor wires applied in opposite directions are often used, and the armor is corrosion protected by a protective layer, for example a bitumen compound and two layers of polypropylene yarn.

HVDC-MI cables are often used to traverse extremely long distances. The cables are not able to be manufactured in one continuous length, however, and therefore sections of cable must be joined together at a transition joint. A challenge arises when the cable sections that must be joined are of a different diameter and/or configuration. One situation where this challenge is particularly acute is where the cable sections to be joined are made by different manufacturers, such as where a cable made by a first manufacturer originating from a first location must be joined with a cable section made by a second manufacturer originating from a second location. While the overall principle of design of the respective HVDC-MI cables from the two manufacturers may be similar, there will be inherent differences in various parameters of the cables, such as overall diameter, diameter of the center wire, total number and dimensions of the stranded wires surrounding the center wire, the thickness and arrangement of the paper lapping, protective layers etc.

The current solution to the problem of joining cables having conductors of different diameter and/or configuration is to utilize a stiff transition joint. In the context of the present invention, the term "stiff transition joint" means a joint where the bending characteristics of a section of the cable comprising the joint is sufficiently different than non-spliced sections of the cable that additional equipment and/or handling procedures are required. For example, WO/2016082860 discloses a conical connection piece to join the conductors of two cable sections having different diameters. The insulation and protective layers are removed, exposing the conductors and the ends of the conical connector are thermally joined/welded to the entire diameter of each conductor, i.e. welded to the center wire as well as the stranded wires of each cable. While the conical connector accommodates the different diameters, the result is a stiff joint. Such a stiff joint is undesirable. Long sections of cable are typically transported on drums/turntables either at land or sea, and a stiff transition joint causes problems when spooling and/unspooling the cable from the drum/turntable. Installation of cables on the sea bed is also hampered by a stiff joint, and cables are much more susceptible to damage at a stiff joint.

A need therefore exists for a flexible transition joint between cable sections having different diameter and/or conductor configurations.

SUMMARY OF THE INVENTION

The invention provides a method of joining two high voltage, stranded cables at a flexible transition joint. In the context of the invention, the term "flexible" means that the transition joint has essentially the same or equal handling capabilities as non-spliced sections of the cable itself under intended use scenarios for the cable. For example, a section of cable comprising a "flexible" transition joint according to the invention may be transported, installed or handled in the same manner as non-spliced sections of the cable without the need for additional or different equipment or handling procedures.

The term "central wire" or "center wire" refers to the innermost wire of the conductor. In one embodiment, a first cable has a central wire having a first diameter, and a second cable has a central wire with a larger diameter.

The term "stranded wires" refers to the relatively thinner (compared to the central wire) wires wrapped about the central wire. In one embodiment, the stranded wires have a keystone shaped cross section.

The stranded wires are wrapped about the central wire in a spiral in layers comprising an integer number of strands per layer. The term "first layer" refers to the innermost layer of strands. The next innermost layer is referred to as the "second layer" and so forth. The outermost layer may be alternatively referred to by its ordinal position, or merely by the term "outer layer" of strands. The strands of different layers of the same cable may have different thicknesses, and the corresponding layers of the two cables may or may not contain an equal number of strands. The strands of a given layer travel together in tandem, adjacent to one another, in a spiral about the central wire. The layers alternate in the direction of the spiral.

The term "lay length" refers to the horizontal length along the cable required for the strands of a layer to travel from a first circumferential position (for example the top of the cable), around and back up to the same circumferential position.

According to the method of the invention, the protective layers and insulation layers are removed from a terminal portion of each cable, thereby exposing the conductors. The various layers of stranded wires are then sequentially unwound, and the stranded wires pulled back in the upstream direction of the cable, resembling the peeling back of the peel of a banana. The strands of the outermost layer are pulled back a first distance, and a clamp attached about the remaining strands. Then the next layer of strands is unwound and pulled back and a second clamp attached, and so on, until all the layers of stranded wires have been pulled back and clamped, thus exposing the central wire of the cables.

In the event the central wires of the two cables are of different diameter, an elongated, conical connection piece is used to connect the central wires of the two cables together. One end of the conical connection piece is welded or brazed to the end of the first central wire, and the end of the second central wire is welded or brazed to the opposite end of the conical connection piece. The conical connection piece has a length and slope that is predetermined in relation to inter alia the lay length and thickness of the various layers of stranded wires.

The first layer of stranded wires of the first cable is thereafter rewrapped in a spiral about the cable and up and about the conical connection piece and cut, so that the ends of each strand of the layer rests in a top position. The first layer of stranded wires from the second cable are likewise rewrapped in a spiral about its central wire and cut so that the ends of its strands are adjacent the ends of the strands from the first cable. The ends of the stranded wires from the two cables are then thermally connected by welding or brazing. In the event that there are different numbers of strands in the corresponding layers from the two cables, then two stands may be welded to a single strand a sufficient number of times to account for the difference in total strands.

A sanding/grinding/machining device is then utilized to shape the welded-together strands to a uniform slope corresponding to the slope of the conical connection piece and the clamps from the first layers are removed. In the event the strands from the two cables are of different thickness, the ends of the cut strands are arranged in the horizontal direction in relation to the conical connection piece and then a portion of the thicker strands are mechanically removed by the sanding/grinding/machining device. The result of this operation is a smooth conical transition of the first layer of strands from the smaller to the larger cable.

The above operation is repeated for the second layer of stranded wires. The stranded wires from the first cable are rewrapped about the finished first layer and cut so that the ends rest at a top position. The stranded wires from the second layer of the other cable are likewise rewrapped and cut, and the stranded wires thermally joined and mechanically shaped to a uniform slope corresponding to the slope of the conical connection piece. Again, two strands may be joined to a single strand to account for a different total number of strands from corresponding layers. As with the first layer, the ends of the strands are arranged in the horizontal direction such that a portion of the thicker strands are mechanically removed in the event the strands from the corresponding second layers are of different thickness.

This operation is repeated for all the layers of stranded wires, resulting in the conductors of the two cables being connected at a flexible conductor joint.

The next step of the method is the reapplication of the insulation layer. In the case of a Mass Impregnated cable, this step comprises the use of a paper lapping machine arranged to oscillate back and forth along the transition joint, applying layers of paper insulation to a desired thickness. According to one aspect, the insulation layers are originally removed from the conductors at an angle sloping upwards and back from the conductors. The lapping machine will thus oscillate back and forth until it contacts with the edge of the original insulation, traveling an increasing distance for each layer of paper applied. The reapplied insulation layer will thus have a trapezoidal longitudinal cross section when reapplied. The paper is wrapped in an overlapping manner to avoid electrical losses between layers of paper.

The various other protective layers are thereafter reapplied by methods known in the art.

BRIEF DESCRIPTION OF THE DRAWINGS

The invention will be described in more detail with reference to the accompanying drawings, wherein:

FIG. 9 is a side elevational view of the completed first layer

DETAILED DESCRIPTION

The invention will be now be described with reference to a specific example of joining two HVDC-MI cables. It should be understood however that the invention is suitable for the joining of other types of cables than HVDC-MI cables so long as the cable is of the type having a conductor with a central wire surrounded by stranded wires.

Example

Figure 1A:
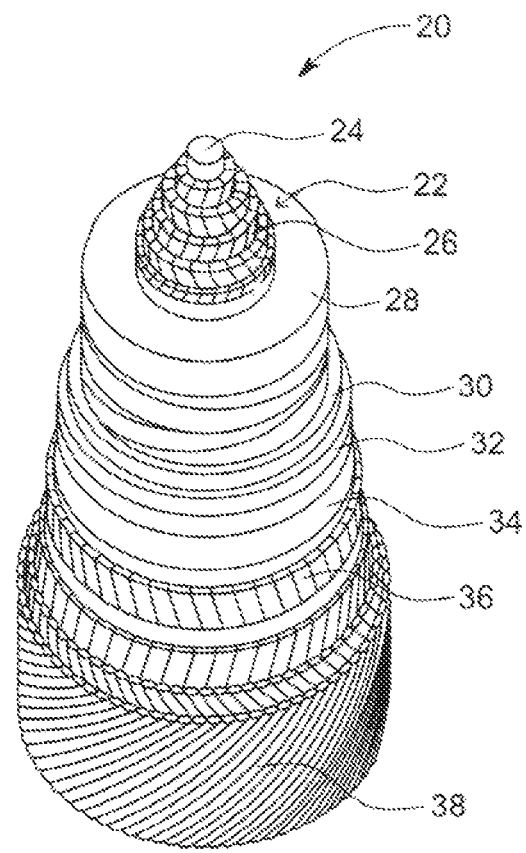
FIGS. 1A and 1B are perspective views of a first and second high voltage DC mass impregnated cable.
Figure 1B:
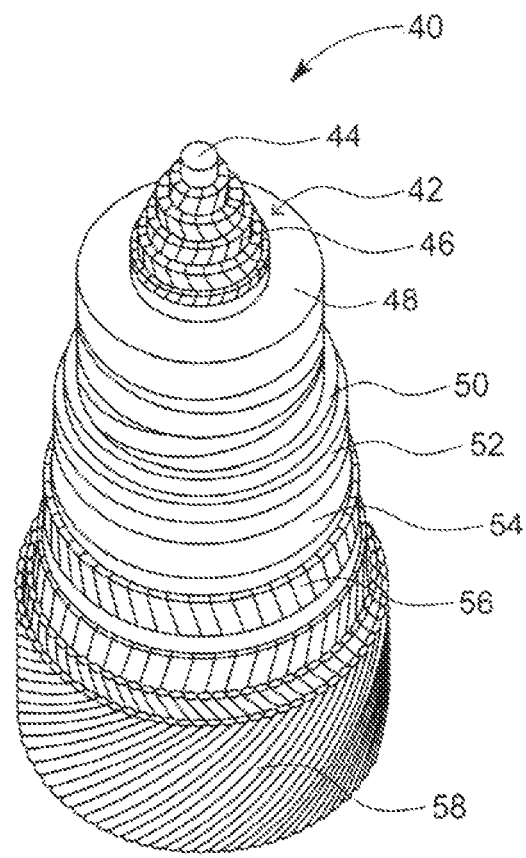

A first cable 20 of the type as illustrated in FIG. 1A is to be joined with a second cable 40 of similar type as illustrated in FIG. 1B (albeit with cable 40 having a conductor with different diameter and/or configuration than that of cable 20).

Figure 2A:
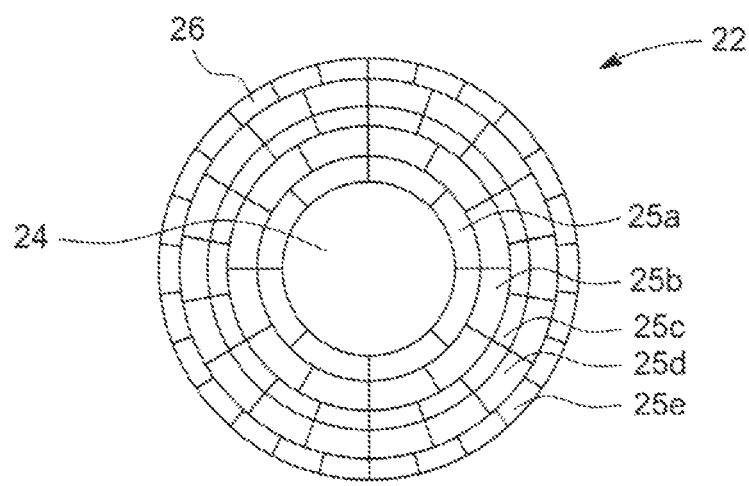
FIGS. 2A and 2B are cross sectional and perspective views of the conductor of the cable from FIG. 1.

As shown in FIGS. 1A and 2A/B, first cable 20 comprises a conductor 22 surrounded by a plurality of insulating/protective layers. Conductor 22 comprises a central wire 24 surrounded by layers of stranded wires 26. Such a configuration with a central wires and stranded wires, known in the art, improves the flexibility of the cable.

Figure 2B:
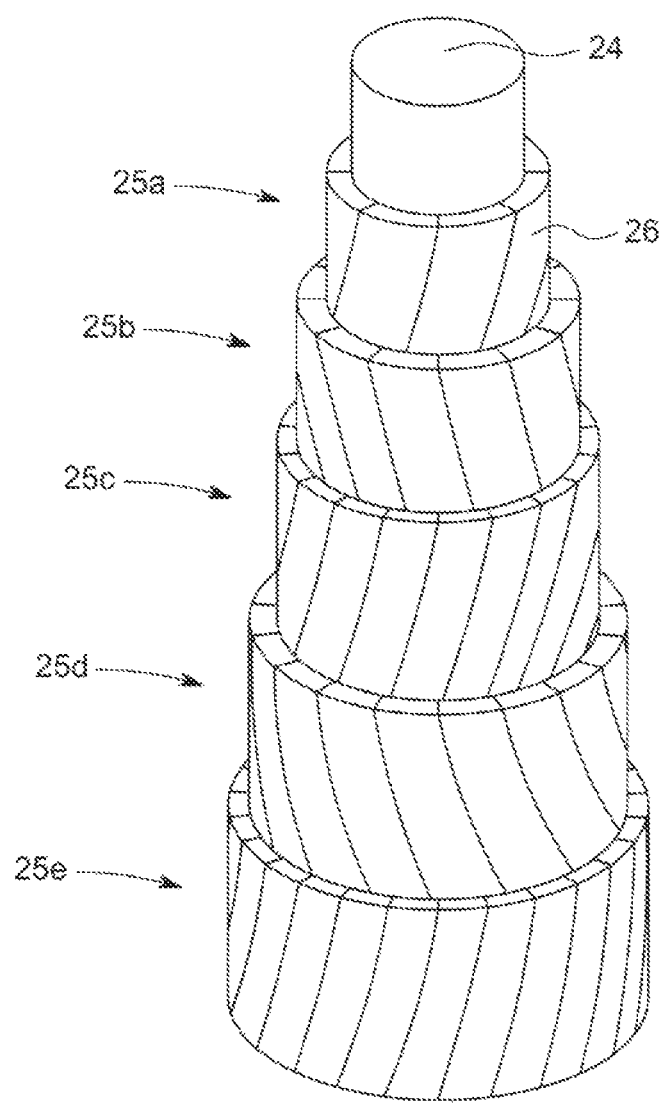

As shown in FIG. 2A/B, central wire 24 is a round wire, and stranded wires 26 are keystone shaped in order to be tightly packed about the central wire 24. In the example used herein, there are five layers 25a-e of stranded wires 26. Stranded wires 26 are wrapped in a spiral about central wire 24, with alternating layers being wrapped in alternating directions, as shown in FIG. 2B.

Surrounding conductor 22 are a plurality of insulating and/or protective layers. Immediately adjacent conductor 22 is an insulation layer 28. In this example, the insulation layer is a mass-impregnated paper insulation known in the art, comprising a plurality of wrapped layers of oil-impregnated paper.

Outside the insulation layer 28 is a water tight lead barrier layer 30. About lead layer 30 is arranged polyethylene layer 32. A strengthening layer 34 of galvanized steel is arranged about polyethylene layer 32. An armor layer 36 comprising galvanized steel bands protects the cable from abrasion and other forces. Finally, the cable comprises an outer protective layer 38 of bitumen/polypropylene yarn.

Second cable 40 as shown in FIG. 1B is, in this example, also a HVDC-MI cable of similar configuration as first cable 20, albeit with a conductor 42 having a central wire 44 with a larger diameter and different total number of stranded wires 46 than conductor 22 of cable 20. For the purposes of the example, it is assumed that second cable 40 has the same arrangement of insulating/protective layers as first cable 20, namely: an insulation layer 48, a water tight lead barrier layer 50, a polyethylene layer 52, a galvanized strengthening layer 54, an armor layer 56 and an outer protective layer 58.

Table 1 below lists the parameters and dimensions of the center wire 24/44 and stranded wires 26/46 of the conductors of the two cables joined in the example. It should be understood, however, that the dimensions discussed are for illustrative purposes, and are not meant to necessarily be limiting for the invention. Cables having other dimensions and configurations can be connected by the method of the invention.

TABLE 1

| | Dimension (mm) | Lay length | Layer height | Direction of spiral (Right or Left) | Number of strands per layer |
|---|---|---|---|---|---|
| First Cable | | | | | |
| Center wire | 12.0 | | 6.0 (radius) | | |
| 1st layer of stranded wires | 18.9 | 207.8 | 3.5 | R | 8 |
| 2nd layer | 27.3 | 225.0 | 4.2 | L | 12 |
| 3rd layer | 32.7 | 328.0 | 2.7 | R | 18 |
| 4th layer | 40.5 | 372.0 | 3.9 | L | 18 |
| 5th layer | 46.3 | 472.0 | 2.9 | R | 26 |
| Second cable | | | | | |
| Center wire | 15.0 | | 7.5 (radius) | | |
| 1st layer | 23.4 | 213.00 | 4.2 | R | 9 |
| 2nd layer | 31.6 | 296.0 | 4.1 | L | 15 |
| 3rd layer | 39.6 | 376.0 | 4.0 | R | 18 |
| 4th layer | 47.8 | 458.0 | 4.1 | L | 20 |
| 5th layer | 54.7 | 530.0 | 3.5 | R | 24 |

Figure 3:
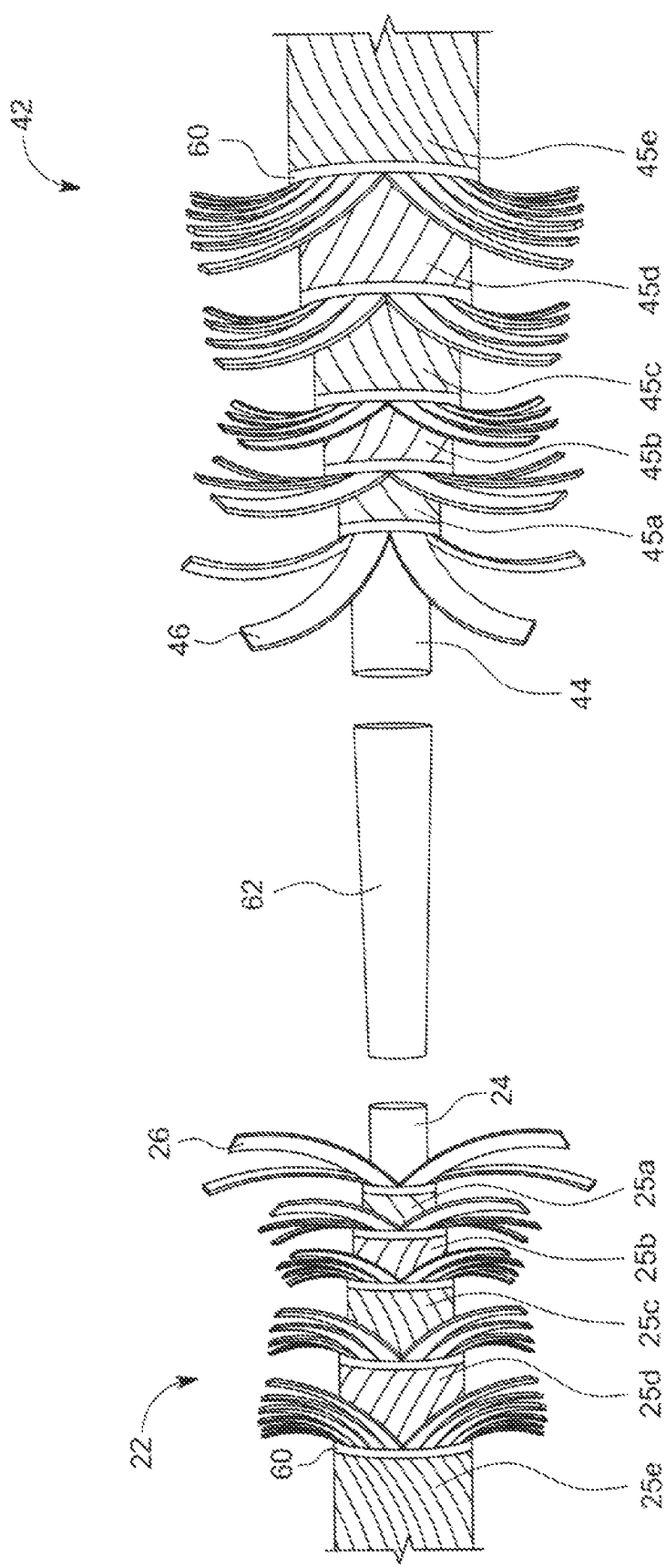
FIG. 3 is a side elevational, exploded view of the conductors of the first and a second HVDC-MI cable, with stranded wires pulled back, and with a conical connection piece arranged between the center wires of the two conductors.

According to the method of the invention, the outer protective and insulation layers are removed from terminal portions of the first and second cables, thus exposing their respective conductors 22 and 42 as shown in FIG. 3.

Stranded wires 26/46 from outer layer 25e/45e are unwound and pulled back in the upstream direction, and clamped off with a clamp 60. This operation is repeated for layers 25/45 d, c, b and a, thus exposing central wires 24 and 44. For simplicity sake, FIG. 3 shows strands 26/46 shorter than in a real word scenario. A more realistic representation of the pulled back strands 26/46 may be seen in FIG. 7.

Figure 7:
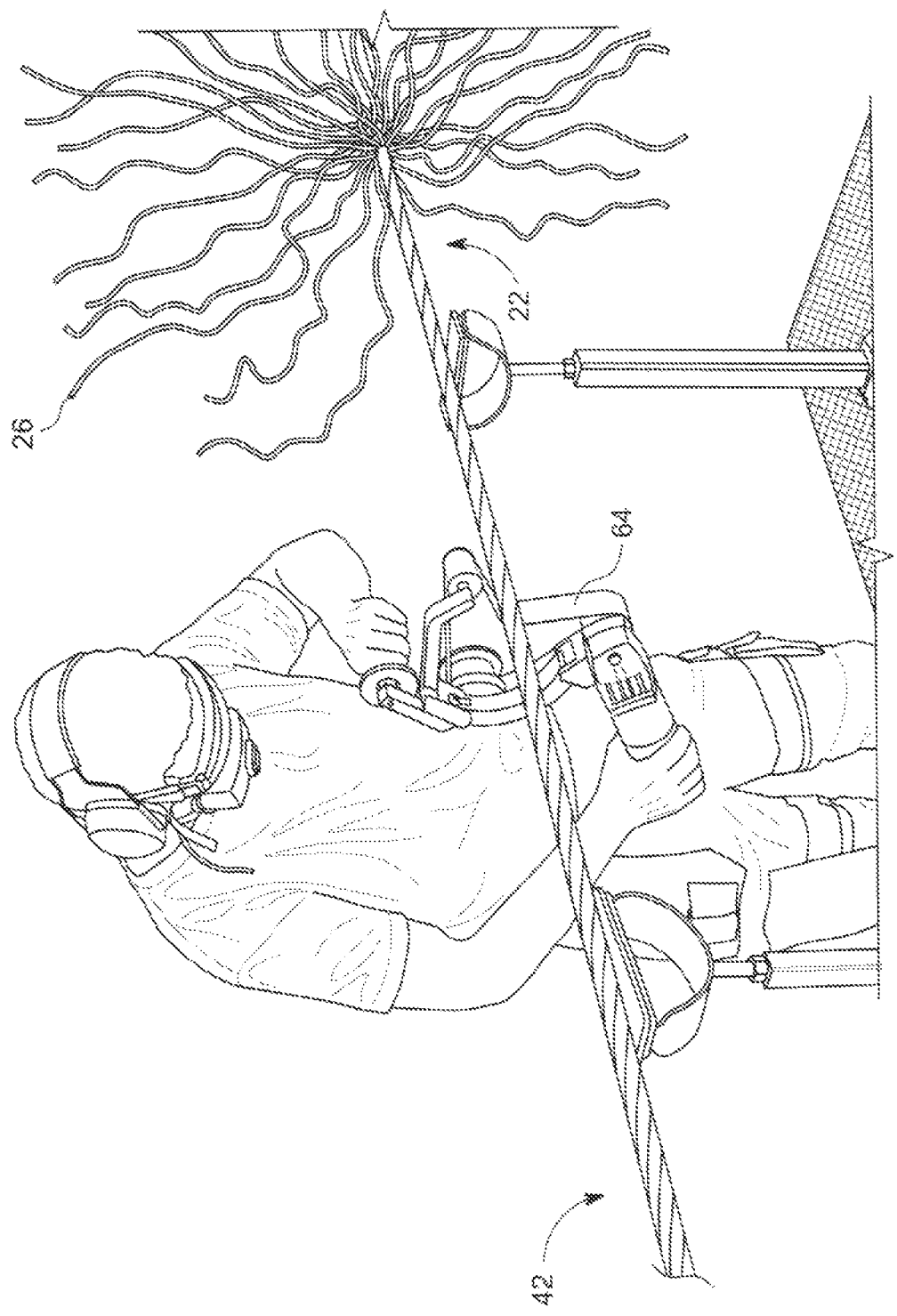
FIG. 7 is a perspective view showing an operator sanding or grinding the first layer of connected strands.

A conical connection piece 62 as shown in FIG. 3 is thereafter thermally joined between central wires 24 and 44 and sanded to a smooth surface using a sanding device 64 as shown in FIG. 7.

Figure 4:
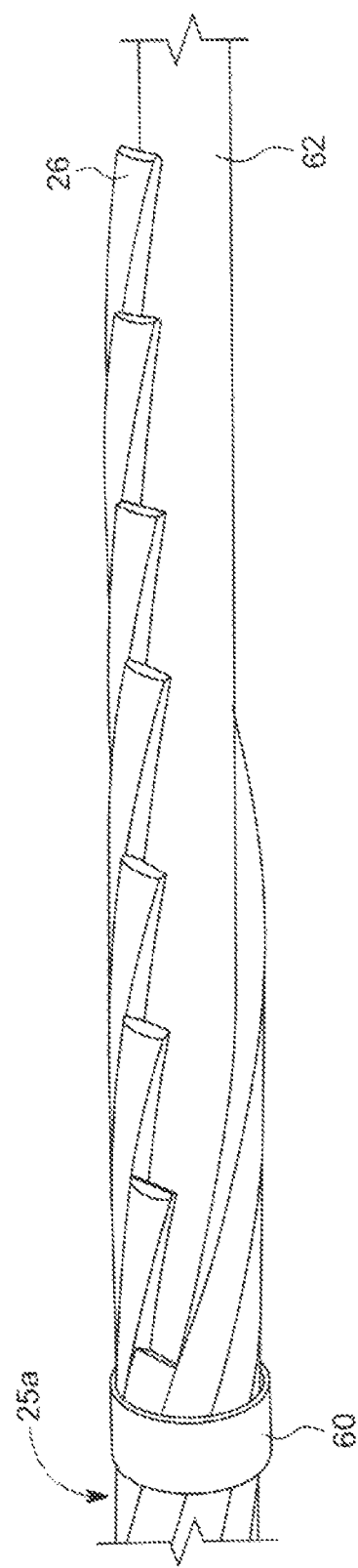
FIG. 4 is a perspective view of the first layer of stranded wires of the first conductor cut and arranged upon the conical connection piece.
Figure 5:
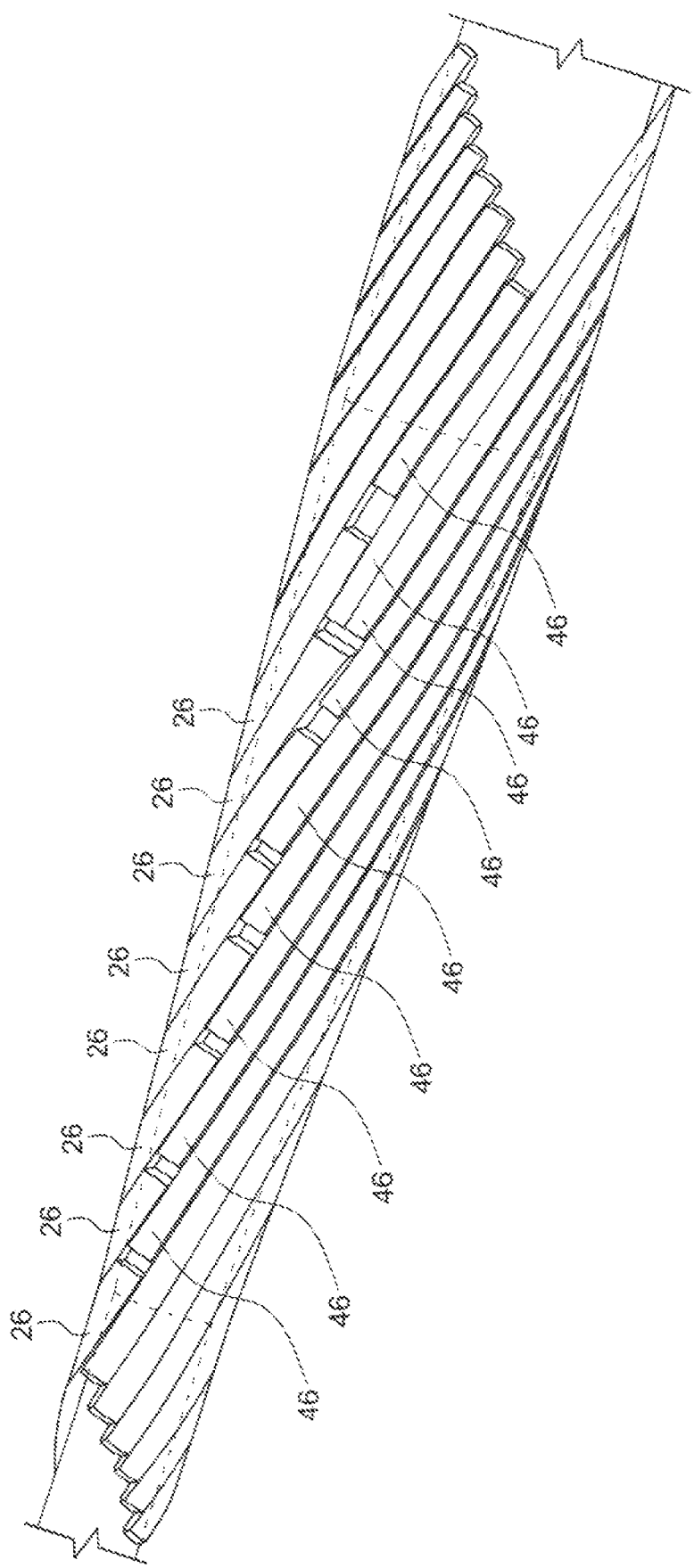
FIG. 5 is a top view showing stranded wires of the first layer from the first and second conductors with their respective ends aligned prior to being thermally joined.
Figure 6:
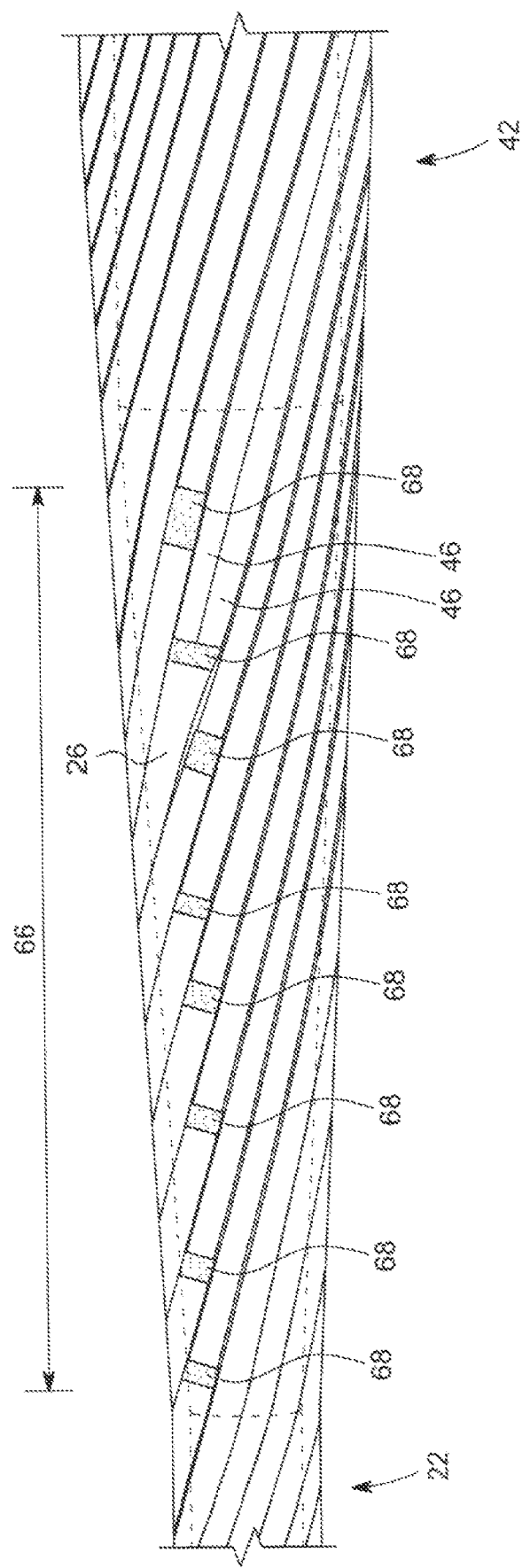
FIG. 6 is a top view corresponding to FIG. 5, with the ends of the strands joined together and sanded.

In the next step of the method, the stranded wires 26 from first layer 25a of first cable 20 are rewound about the central wire 24 and up upon conical connection piece 62 and cut, such that the ends of stranded wires 26 lay upon conical connection piece 62, as shown in FIG. 4. First layer 25a comprises 8 strands as shown in Table 1, with the horizontal distance between the ends of the outermost strands corresponding to the "lay length" from table 1. Likewise, strands 46 from layer 45a of the second cable 40 are rewound and cut so that the ends are adjacent the ends of strands 26 as shown in FIG. 5. The ends of strands 26 and 46 are welded or soldered together at a joint area 66 as shown in FIG. 6. According to one aspect, the ends are arranged to rest at the top of the conical piece for ease of the welding operation. As shown in Table 1, the first layer 45a comprises one more strand than corresponding layer 25a. Therefore, two strands are welded to a single strand at an appropriate location. In the event that there is more than one extra strand, the double welds should preferably be spaced apart to the extent possible.

Figure 8:
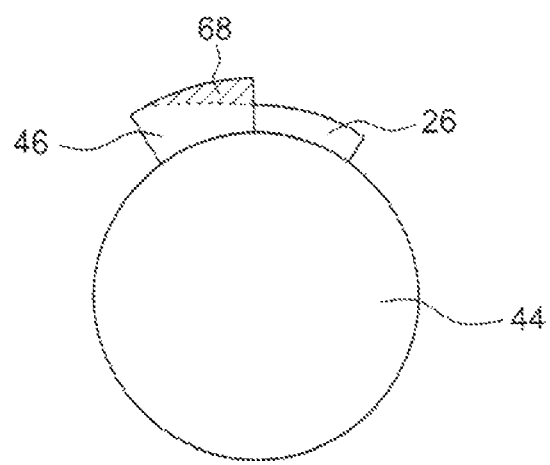
FIG. 8 is a transverse cross sectional view illustrating the difference in height between the strands of the two conductors at the joint area.
Figure 9:
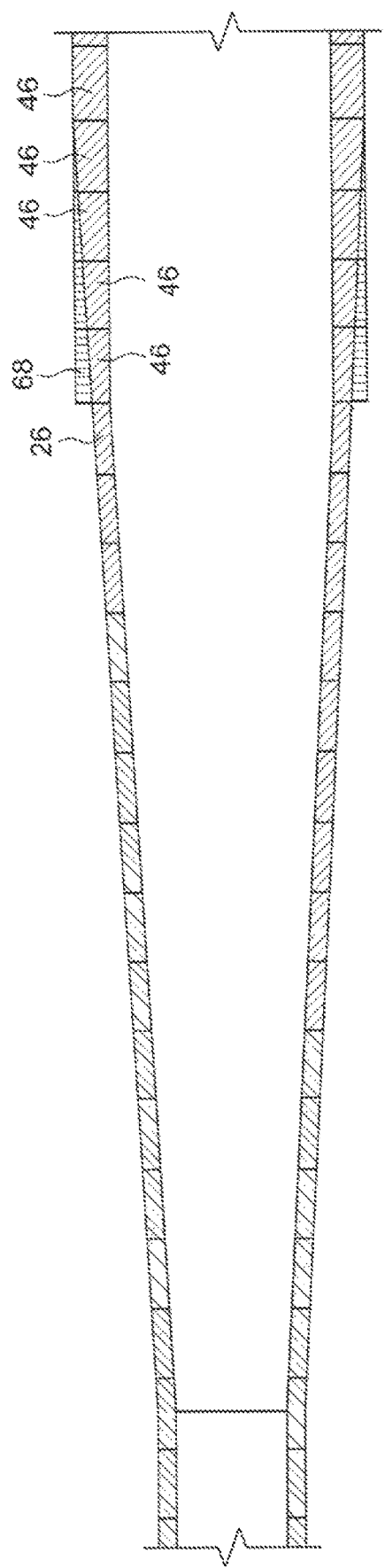
FIG. 9 is a longitudinal cross sectional view showing the grinding area of material removed by the operator from FIG. 7.

When joining cables of different dimensions according to the method of the invention, it is necessary to account for the stranded wires having a different thickness where this is the case. As shown in Table 1, in the current example the stands 26 of first layer 25a of the first cable are 3.5 mm in height whereas the strands 46 of first layer 45a of the second cable are 4.2 mm in height. This difference in height is illustrated in FIGS. 8 and 9, transverse and longitudinal cross sections respectively. An operator therefore utilizes sanding device 64 as shown in FIG. 7 to remove material from strands 46 in a grind zone 68 to a achieve an smooth surface having a slope corresponding to conical connection piece 62. The result is a smooth conical transition from the first cable to the second cable over the connection piece, as shown in FIG. 6.

Figure 10:
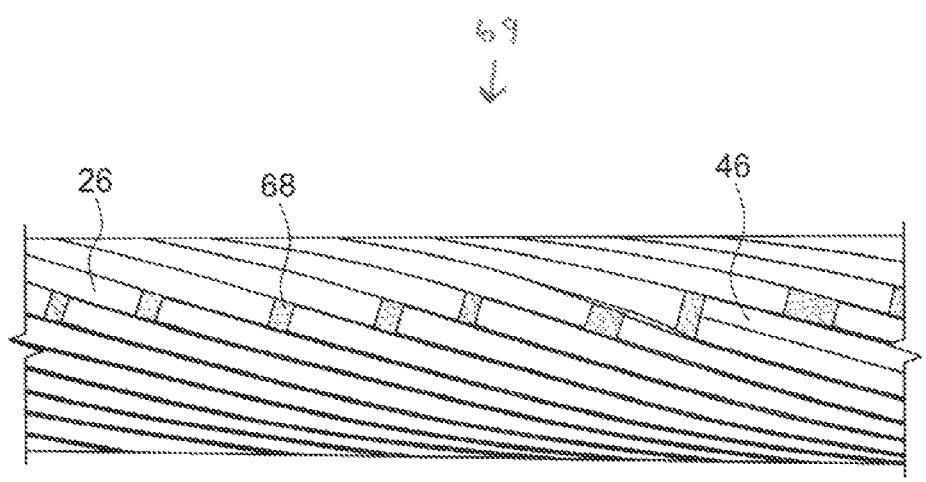
FIG. 10 is a top view of the completed outer layer of joined strands, also showing two strands from one conductor joined to single strand from the other conductor.

The above procedure is repeated for remaining layers 25/45b, c, d and e, resulting a completed transition joint as shown in FIG. 10.

Figure 11:
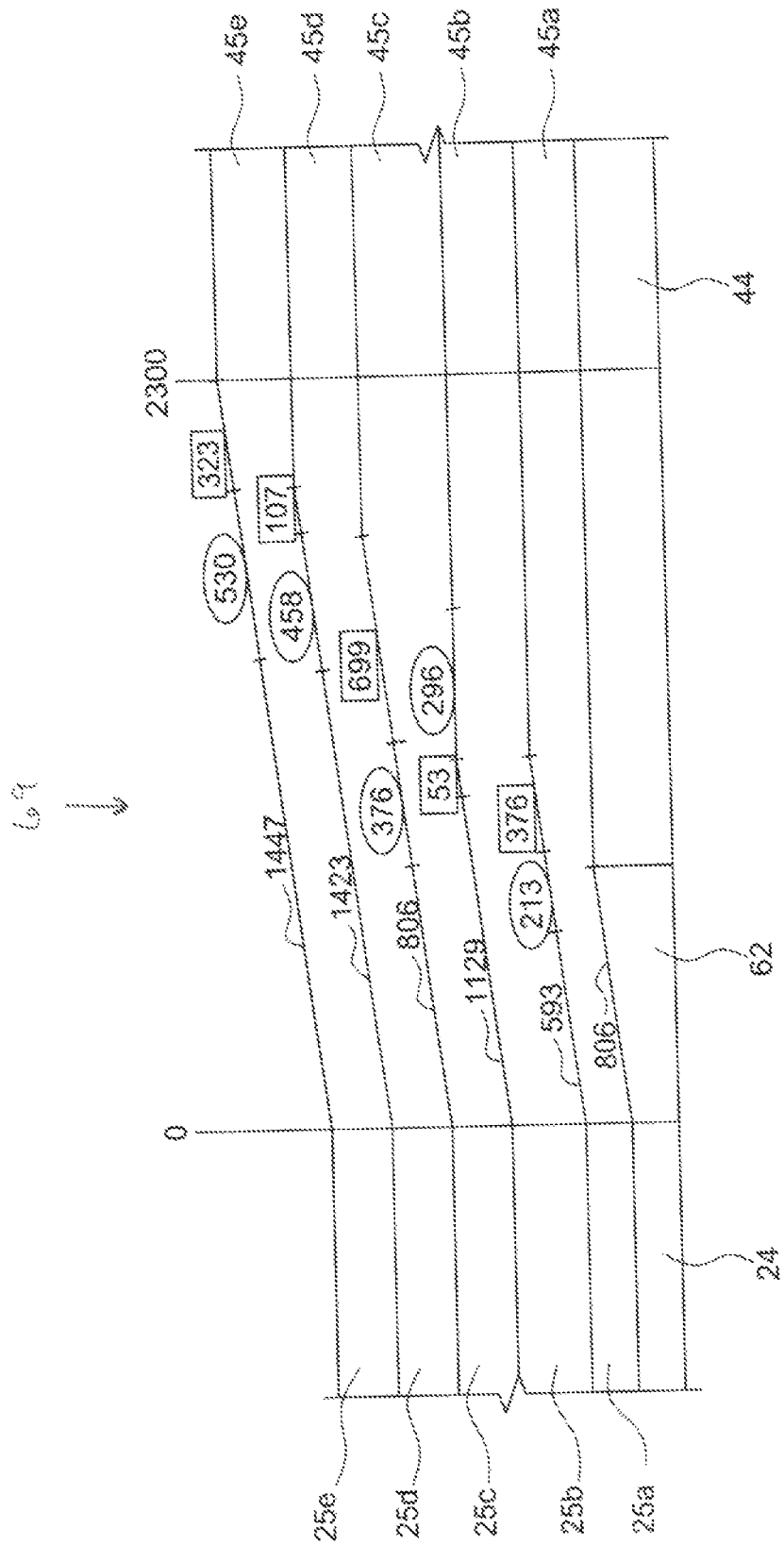
FIG. 11 is a side cross sectional view showing a completed with the dimensions of Table 1.

FIG. 11 is a graphical representation of a cross section of the completed transition joint, according to the dimensions from Table 1. The numbers enclosed in circles represent the "lay length" of the layer having the longest lay length for that particular layer. The number enclosed in boxes represent the grinding zone 68. where material is removed from the thicker of strands 26 or 46, as the case may be. (in this example, the strands from cable 40 are always the thickest, with the exception of layer 25b/45b, where in that instance strand 26 is the thickest.)

Figure 12:
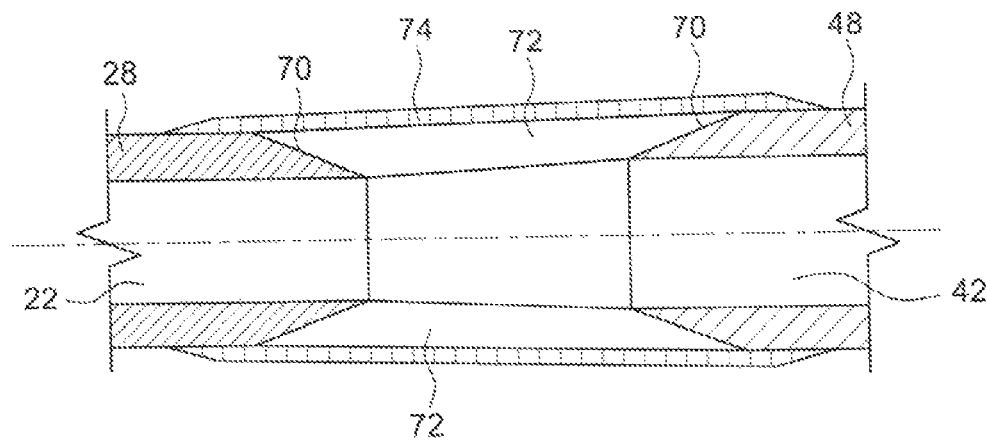
FIG. 12 is a cross sectional view illustrating the reapplying of paper insulation to the joint area.

After the transition joint is completed, the insulation layer is reapplied over the transition joint. As shown in FIG. 12, the original insulation layers 28 and 48 are preferably removed such that a sloped surface 70 is achieved. A paper lapping machine (not illustrated) is caused to oscillate back and forth between sloped surfaces 70, sequentially applying layers of impregnated paper lapping. The lapping is applied to achieve a uniform transition from the first cable to the second cable. As can be seen in FIG. 12, the result is a generally trapezoidal cross section insulation patch 72. A surplus insulation patch 74 made of impregnated paper lapping is then applied about the insulation patch 72.

The remaining protective/armor layers from the two cables are thereafter patched about the transition joint using know techniques in the art.

The invention claimed is:

1. A method for creating a transition joint between two cables each having a conductor with a central wire surrounded by a plurality of layers of stranded wires wound about the central wire, said first and second cables being High Voltage Direct Current (HVDC) Mass Impregnated cables, wherein the method comprises the steps of:
   a. providing two cables wherein the conductor of a first cable of said two cables is of smaller diameter than the conductor of a second cable of said two cables,
   b. removing, from terminal portions of both of said first and second cables, any insulating layers or protective layers surrounding the conductors,
   c. unwinding and pulling back in an upstream direction the plurality of layers of stranded wires of said first and second cables, thereby exposing ends of the central wires of said first and second cables,
   d. thermally joining a connection piece between the ends of the central wires of said first and second cables,
   e. rewinding and thermally joining the stranded wires of the plurality of layers of the first cable to the stranded wires of corresponding layers of the second cable such that:
   each stranded wire of the first cable is abutted against, and joined end-to-end to, one stranded wire of said plurality of layers of stranded wires of the second cable, thus forming a flexible transition joint, and
   when a layer of one of the first and second cables comprises more strands than a corresponding layer from the other of the first and second cables, two strands of the one of the first and second cables are abutted against, and joined directly at their ends thereof, to an end of one strand of the other of the first and second cables, a sufficient number of times to account for a difference in total strands, and
   f. patching any insulating or protective layers about the flexible transition joint,
   wherein the plurality of layers of stranded wires are wound in tandem in a spiral about the respective central wires of said first and second cables, with a horizontal distance required for a strand to pass through a same circumferential position defining a lay length of a layer, said method further comprising the steps of:
   g. rewinding a first layer of strands of the first cable and cutting the strands such that ends of the first layer of strands of the first cable lay atop the connection piece in a row, extending linearly along an axial length of said flexible transition joint, corresponding to the lay length,
   h. rewinding a first layer of strands of the second cable and cutting the strands such that ends of the first layer of strands of the second layer lay adjacent corresponding ends of the first layer of strands from the first cable,
   i. thermally joining the ends of the first and second layer of strands, and
   j. performing steps g-i for remaining layers of the plurality of layers for each of the first and second cables.

2. A method for creating a transition joint according to claim 1, wherein the central wire of the conductor of the first cable is of smaller diameter than the central wire of the conductor of the second cable, and wherein the connection piece is conical.

3. A method for creating a transition joint according to claim 1, wherein the strands of the layers are of different height, and wherein the method further comprises the step of using a sanding or grinding device along the lay length in order to mechanically remove a portion of the higher of the strands to create a smooth transition between the strands, the removed portion defining a grind zone for the joined strands.

4. A method for creating a transition joint according to claim 3, wherein the connection piece is conical, and wherein the grind zone is ground to have essentially the same slope as the conical piece.

5. A method for creating a transition joint according to claim 1 wherein the strands of the layers of the first and second layers are held in their pulled-back positions by clamps.

6. A method for creating a transition joint according to claim 1 wherein the insulating layer are removed from the terminal portions of the first and second cables at a sloped angle, and wherein insulation is patched over the flexible transition joint by causing a paper lapping machine to oscillate back and forth between respective sloped surfaces, sequentially applying layers of impregnated paper lapping material to form an insulation patch.

7. A method for creating a transition joint according to claim 6, further comprising applying a supplement layer of paper lapping about the insulation patch.

* * * * *